US012219361B2

(12) United States Patent
Balmakhtar et al.

(10) Patent No.: US 12,219,361 B2
(45) Date of Patent: *Feb. 4, 2025

(54) 5G NETWORK SLICE DEVICE SECURITY PROTECTION

(71) Applicant: T-Mobile Innovations LLC, Overland Park, KS (US)

(72) Inventors: Marouane Balmakhtar, Fairfax, VA (US); Serge Manning, Plano, TX (US); Greg Schumacher, Holliston, MA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,953

(22) Filed: Jun. 16, 2023

(65) Prior Publication Data

US 2023/0337001 A1 Oct. 19, 2023

Related U.S. Application Data

(63) Continuation of application No. 17/576,313, filed on Jan. 14, 2022, now Pat. No. 11,751,058.

(51) Int. Cl.
*H04W 12/30* (2021.01)
*H04W 12/088* (2021.01)
*H04W 12/102* (2021.01)

(52) U.S. Cl.
CPC ......... *H04W 12/35* (2021.01); *H04W 12/088* (2021.01); *H04W 12/102* (2021.01)

(58) Field of Classification Search
CPC . H04W 12/35; H04W 12/088; H04W 12/102; H04W 48/18; H04W 24/02; H04W 24/10; H04W 84/18
See application file for complete search history.

(56) References Cited

U.S. PATENT DOCUMENTS 11,751,058 B2 9/2023 Balmakhtar et al.
2018/0191782 A1 7/2018 Djordjevic et al.
(Continued)

FOREIGN PATENT DOCUMENTS

WO 20230136878 A1 7/2023

OTHER PUBLICATIONS

Balmakhtar, Marouane, "5g Network Slice Device Security Protection," filed Oct. 31, 2022, International Application No. PCT/US22/48479.
(Continued)

*Primary Examiner* — Liton Miah

(57) ABSTRACT

A method of user equipment (UE) implemented network slice security protection is disclosed. The method comprises the UE receiving a request to initialize an application, querying a UE Route Selection Policy (URSP) stored on the UE, and receiving traffic descriptors and security descriptors in response to the querying. The traffic descriptors identify a network slice for the application. The security descriptors comprise a security flag and a virtualization container ID. The method also comprises the UE initiating the application within a virtualization container corresponding to the virtualization container ID based on the security flag indicating that the network slice is secure and binding traffic for the application in the virtualization container to a PDU session based on the traffic descriptors. The method further comprises communicating, by the application executing within the virtualization container, with a core network over the PDU session via the network slice bound to the virtualization container.

20 Claims, 11 Drawing Sheets

(56) References Cited

U.S. PATENT DOCUMENTS

| | | | |
|---|---|---|---|
| 2018/0352501 A1 | 12/2018 | Zhang et al. | |
| 2019/0053104 A1* | 2/2019 | Qiao | H04W 28/24 |
| 2020/0053622 A1 | 2/2020 | Huang-Fu et al. | |
| 2020/0389843 A1 | 12/2020 | Huang et al. | |
| 2021/0007157 A1* | 1/2021 | Li | H04W 76/10 |
| 2021/0385724 A1 | 12/2021 | Wang et al. | |
| 2022/0038986 A1* | 2/2022 | Soliman | H04W 40/02 |
| 2022/0039004 A1 | 2/2022 | Soliman et al. | |
| 2022/0124595 A1* | 4/2022 | Xu | H04W 40/248 |
| 2022/0353745 A1 | 11/2022 | Hua et al. | |
| 2023/0060976 A1* | 3/2023 | Zhang | H04L 67/141 |
| 2023/0232236 A1 | 7/2023 | Balmakhtar et al. | |
| 2023/0276352 A1* | 8/2023 | Wang | H04L 41/5041 455/434 |
| 2023/0289432 A1* | 9/2023 | Liu | H04W 48/18 |
| 2024/0049100 A1* | 2/2024 | Zhang | H04W 40/02 |
| 2024/0187977 A1* | 6/2024 | Chong | H04W 8/22 |

OTHER PUBLICATIONS

Foreign Communication from a Related Counterpart—International Search Report and Written Opinion dated Feb. 8, 2023 filed on Oct. 31, 2022 International Application No. PCT/US22/48479.

Notice of Allowance dated Mar. 30, 2023, U.S. Appl. No. 17/576,313, filed Jan. 14, 2022.

* cited by examiner

5G NETWORK SLICE DEVICE SECURITY PROTECTION

CROSS-REFERENCE TO RELATED APPLICATIONS

This application is a continuation of and claims priority under 35 U.S.C. § 120 to U.S. patent application Ser. No. 17/576,313, filed on Jan. 14, 2022, entitled "5G Network Slice Device Security Protection," by Marouane Balmakhtar, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND 5G network slicing is a network configuration that enables multiple virtualized and independent logical networks to be created on the same physical network infrastructure. Each network slice is a potentially isolated, end-to-end network tailored to fulfil the specific needs of a particular application or customer.

SUMMARY

In an embodiment, a method of user equipment (UE) implemented network slice security protection is disclosed. The method comprises receiving, by the UE, a first request to initialize a first application on the UE and, in response to receiving the first request, performing, by the UE, a first query of a UE Route Selection Policy (URSP) stored on the UE based on the first application. The URSP comprises a plurality of traffic descriptors and a plurality of security descriptors. The method also comprises, in response to the first query, receiving, by the UE, traffic descriptors and security descriptors associated with the first application. The traffic descriptors associated with the first application identify a first network slice to be used by the first application. The security descriptors associated with the first application comprise a first security flag indicating that the first network slice is not secure. The method additionally comprises binding, by the UE, traffic for the first application to a protocol data unit (PDU) session based on the traffic descriptors associated with the first application and communicating, by the first application, with a core network via the first network slice. The method further comprises receiving, by the UE, a second request to initialize a second application on the UE, in response to receiving the second request, performing, by the UE, a second query of the URSP stored on the UE based on the second application, and, in response to the second query, receiving, by the UE, traffic descriptors and security descriptors associated with the second application. The traffic descriptors associated with the second application identify a second network slice to be used by the second application. The security descriptors associated with the second application comprise a second security flag and a virtualization container ID. The method additionally comprises initiating, by the UE based on the second security flag indicating that the second network slice is secure, the second application within a virtualization container corresponding to the virtualization container ID. The virtualization container is bound to the second network slice. The method further comprises binding, by the UE, traffic for the second application in the virtualization container to a PDU session based on the traffic descriptors associated with the second application and communicating, by the second application executing within the virtualization container, with the core network via the second network slice bound to the virtualization container.

In another embodiment, a method of user equipment (UE) implemented network slice security protection is disclosed. The method comprises receiving, by the UE, a request to initialize an application on the UE and, in response to receiving the request, querying, by the UE, a UE Route Selection Policy (URSP) stored on the UE based on the application. The URSP comprises a plurality of traffic descriptors and a plurality of security descriptors. The method also comprises, in response to the querying, receiving, by the UE, traffic descriptors and security descriptors associated with the application. The traffic descriptors associated with the application identify a network slice to be used by the application. The security descriptors associated with the application comprise a security flag, a virtualization container ID, and a tunnel ID. The method additionally comprises initiating, by the UE based on the security flag indicating that the network slice is secure, the application within a virtualization container corresponding to the virtualization container ID. The virtualization container is bound to the network slice. The method further comprises providing, by the UE, one or more of the security descriptors to the virtualization container, binding, by the UE, traffic for the application in the virtualization container to a protocol data unit (PDU) session based on the traffic descriptors associated with the application, and establishing, by a secure tunnel manager executing in the virtualization container, a secure tunnel over the PDU session. The secure tunnel is established based on the tunnel ID. The method additionally comprises communicating, by the application executing within the virtualization container, with a core network or another network over the secure tunnel within the network slice bound to the virtualization container.

In yet another embodiment, a method of user equipment (UE) implemented network slice security protection is disclosed. The method comprises receiving, by the UE, a request to initialize an application on the UE and, in response to receiving the request, querying, by the UE, a UE Route Selection Policy (URSP) stored on the UE based on the application. The URSP comprises a plurality of traffic descriptors and a plurality of security descriptors. The method also comprises, in response to the querying, receiving, by the UE, traffic descriptors and security descriptors associated with the application. The traffic descriptors associated with the application identify a network slice to be used by the application. The security descriptors associated with the application comprise a security flag and a virtualization container ID. The method additionally comprises initiating, by the UE based on the security flag indicating that the network slice is secure, the application within a virtualization container corresponding to the virtualization container ID. The virtualization container is bound to the network slice. The method further comprises binding, by the UE, traffic for the application in the virtualization container to a protocol data unit (PDU) session based on the traffic descriptors associated with the application and communicating, by the application executing within the virtualization container, with a core network over the PDU session via the network slice bound to the virtualization container.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1A:
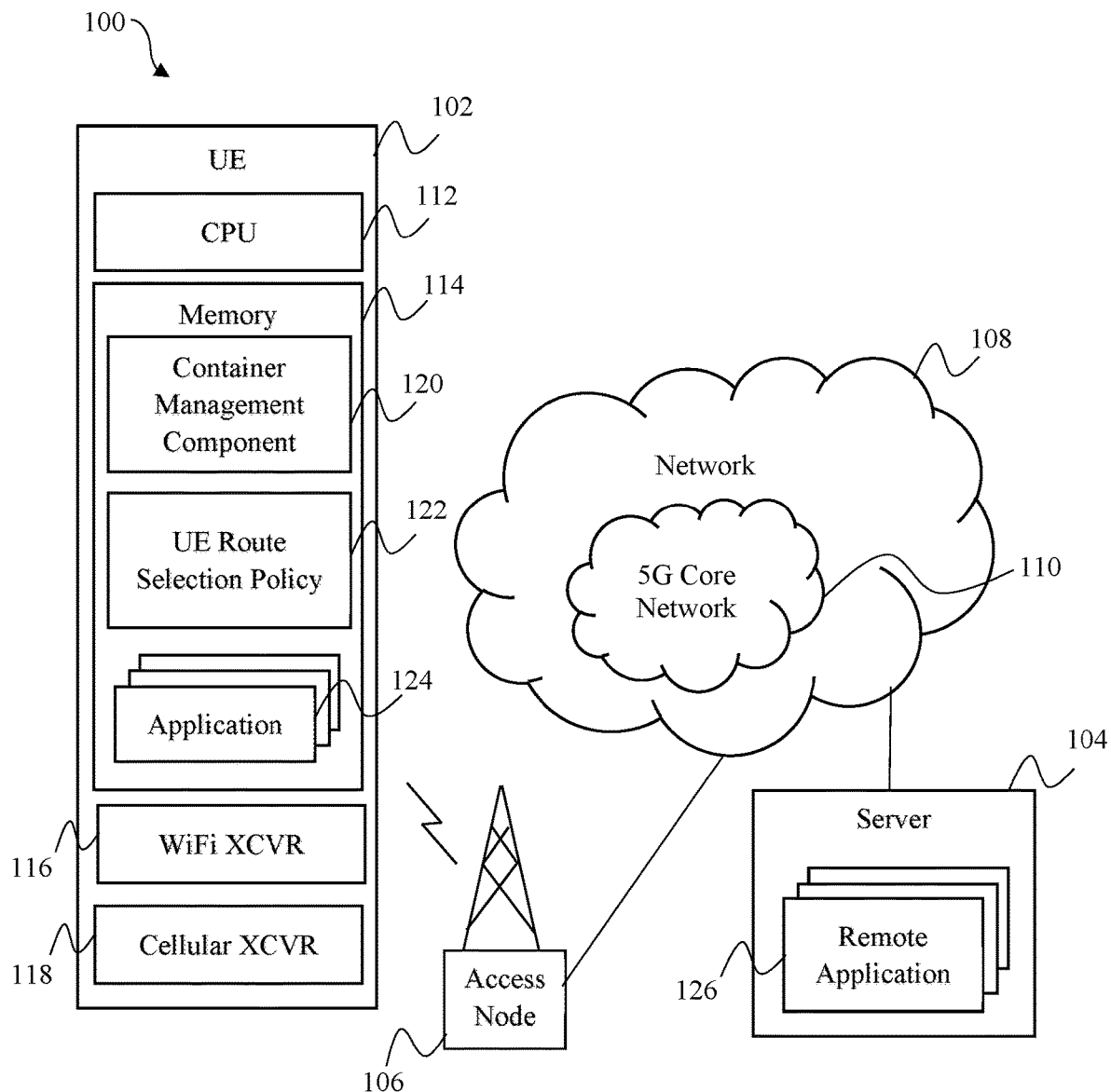
FIG. 1A is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Network slicing is a significant new functionality delivered in the 5G communication network. The user equipment (UE) plays a key role in 5G network slicing and as such security protection is desired at the device level. Currently, however, security weaknesses exist at the device level. For example, there is no segregation of slices on a UE. Thus, an application that is not secure executing on the UE communicating using a first network slice could potentially eavesdrop on or infiltrate a second network slice associated with a secure application executing on the UE, thereby making the second network slice not secure and possibly resulting in secure data leakage or infiltration.

To address this security vulnerability, the pending application is directed to restricting applications that need secure communications to a virtualization container by extending the existing 5G UE Route Selection Policy (URSP) construct. Stated differently, the pending application is directed to binding a virtualization container to a network slice and restricting an application to executing within the virtualization container by adding new security descriptors to govern security aspects of PDU sessions associated with different applications. The USRP, based on the extension, help the UE to enforce secure traffic rules.

The existing URSP provides traffic information such as which network slice and protocol data unit (PDU) session within that network slice a given service or application should use when it is operating to communicate (for example with a remote application). Extension of the existing URSP construct includes the addition of security descriptors. The security descriptors may include a security flag indicating whether or not a network slice is to be secure, a virtualization container ID, a tunnel ID, and/or other information. The extended URSP can provide security rules that result in an application launching within a virtualization container when the application is to use a secure network slice, thereby resulting in the virtualization container being bound to the network slice. The binding of the virtualization container to the network slice results in all applications on the UE, which operate using the network slice, executing within the virtualization container. A virtualization container as discussed herein may comprise an operating system container, a virtual machine, a hypervisor type of container, or another type of container.

For example, when the UE queries the URSP in response to a request to initialize an application, traffic information and security descriptors associated with the application may be returned to the UE. The security descriptors may comprise a security flag indicating that the network slice is secure as well as a container ID. Based on the security flag indicating that the network slice is to be secure, the UE may initiate the application within a virtualization container corresponding to the virtualization container ID. The UE may then bind traffic for the application in the virtualization container to a PDU session based on the traffic descriptors. Then the application executing within the virtualization container may communicate with the core network via the network slice bound to the virtualization container. Execution of the application within the virtualization container bound to the network slice creates a secure boundary that helps prevent data leakage from the network slice to other network slices.

The security rules provided by the extended USRP may also result in establishment of a secure tunnel within the virtualization container between the UE and a user plane element in the core network or between the UE and a network, such as a private network, beyond the edge of the core network, thereby resulting in the virtualization container and the secure tunnel being bound to the network slice. The binding of the virtualization container and the secure tunnel to the network slice results in all applications, which operate using the network slice, executing within the virtualization container and transmitting data via the secure tunnel. For example, in addition to how the virtualization container is bound to the network slice discussed above, the security descriptors received by the UE from the URSP may comprise a tunnel ID. The UE may provide one or more of the security descriptors including the tunnel ID to the virtualization container and a secure tunnel manager in the virtualization container may establish a secure tunnel based on the tunnel ID if the secure tunnel is not yet in existence. Then the application executing within the virtualization container may communicate with the core network over the secure tunnel within the network slice bound to the virtualization container. In addition to execution of the application within the virtualization container being bound to the network slice, use of the secure tunnel for data transmission also creates a more secure boundary that helps prevent data leakage from the network slice to other network slices.

In some cases, data communicated via the secure tunnel may be encrypted based on encryption keys. For added security, the encryption keys may be stored within the virtualization container. Since other applications on the UE outside the virtualization container cannot access the virtualization container, those other applications cannot access the encryption keys stored in the virtualization container and hence would be not be able to gain access into the secure tunnel.

The extended URSP helps to promote segregation on the UE to provide security at the device level. In particular, the system disclosed herein supports a variety of different segregation scenarios to provide security protection at the UE including segregation between a secure application executing in a virtualization container and an application that is not secure executing on the UE, segregation between applications executing in different virtualization containers, and segregation between applications executing in the same virtualization container.

Turning now to FIG. 1A, a communication system 100 is described. In an embodiment, the system 100 comprises a user equipment (UE) 102, a server 104, an access node 106, a network 108, and a 5G core network 110. The UE 102 may comprise a processor 112, a non-transitory memory 114, a WiFi radio transceiver 116, and a cellular radio transceiver 118. The UE 102 may be a mobile phone, a smart phone, a personal digital assistant (PDA), a wearable computer, a headset computer, a laptop computer, a notebook computer, or a tablet computer. The cellular radio transceiver 118 may be configured to establish a wireless communication link with access node 106 according to a 5G, a long-term evolution (LTE), a code division multiple access (CDMA), or a global system for mobile communication (GSM) telecommunication protocol. The access node 106 is able to communicatively couple the UE 102 to a network 108 and therethrough to other communication endpoints communicatively coupled to the network 108. The network 108 may comprise one or more public networks, one or more private networks, or a combination thereof. The network 108 may comprise or be coupled to the 5G core network 110.

The non-transitory memory 114 may comprise a container management component 120, UE Route Selection Policy (URSP) 122, and a plurality of applications 124. The server 104 may comprise a plurality of remote applications 126. The applications 124 may communicate with remote applications 126. While illustrated on a single server 104, the remote applications 126 may be located on different servers without departing from the spirit or scope of the present disclosure. The server 104 be a general purpose computer described in more detail in regard to FIG. 3.

The URSP 122 may be provided to the UE 102 by a network operator. The URSP 122 may comprises traffic rules for each of the applications 124. For example, the URSP 122 may comprise a plurality of traffic descriptors. The traffic descriptors may include an application ID, a slice ID, a data network name (DNN), and/or other information. For each application, the traffic descriptors define which network slice and PDU session within that network slice the given application should use when it is operating to communicate (for example with a remote application 126).

In addition to the traffic rules, the URSP 122 may be extended to include security rules for each of the applications 124. For example, the URSP 122 may comprise a plurality of security descriptors. The security descriptors may include a security flag, a virtualization container ID, a user plane confidentiality protection flag, and/or other information. The network operator may provide updated URSP 122 to the UE 102 as needed such as when traffic descriptors and/or security descriptors change for one or more of the applications 124.

Figure 1B:
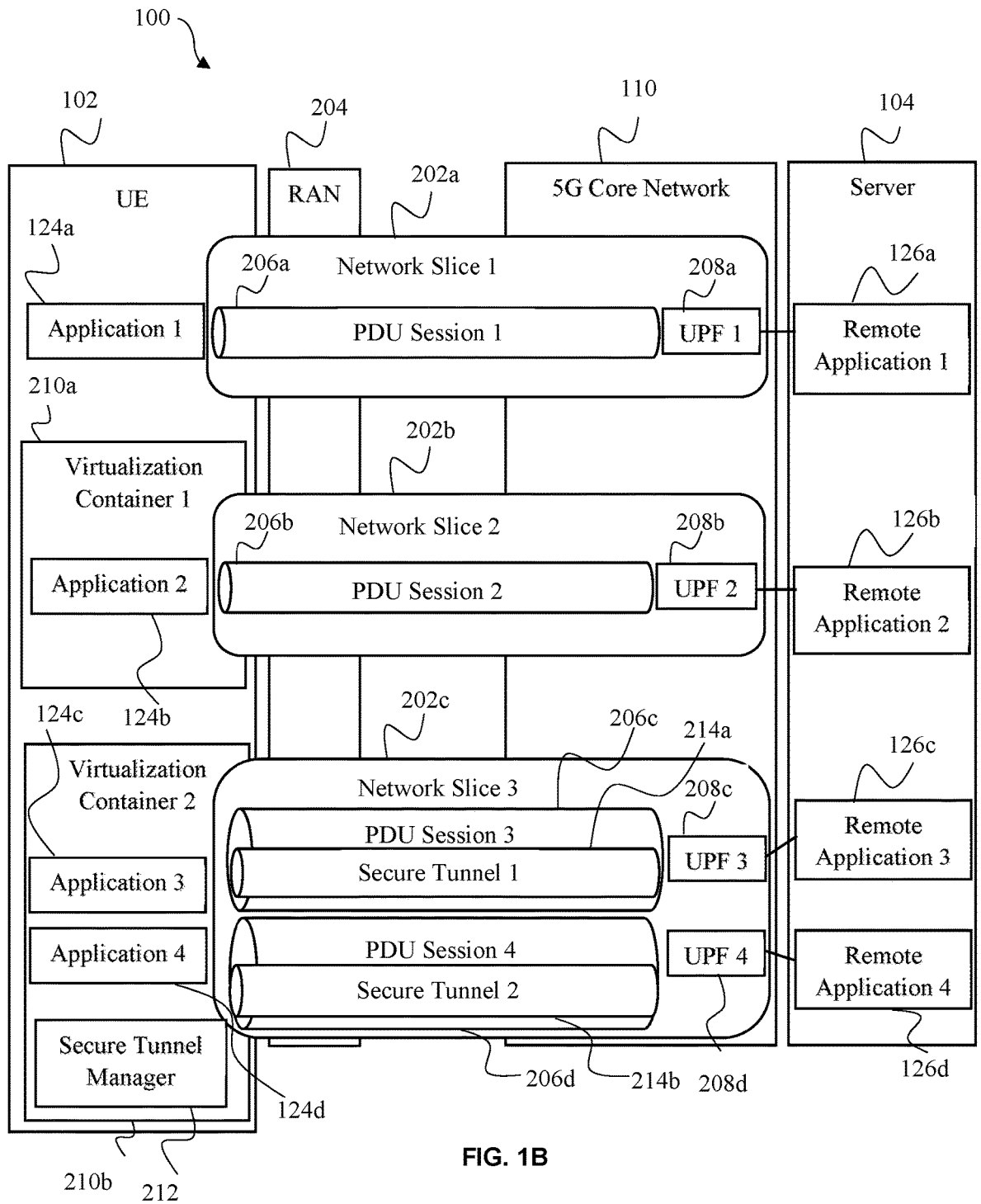
FIG. 1B is a block diagram of elements of the communication system of FIG. 1A according to an embodiment of the disclosure.

Turning now to FIG. 1B, different potential scenarios are described. These scenarios may occur by themselves or in combination with each other. In a first scenario, the UE 102 receives a request, such as from a user of the UE 102, to initialize a first application 124a on the UE 102. The first application 124a may be an application not requiring secure slice support. In response to receiving the request, the UE 102 queries the URSP 122 based on the first application 124a. For example, the UE 102 may query the URSP 122 based on an application ID of the first application 124a. In response to the querying, the UE 102 receives traffic descriptors and security descriptors associated with the first application 124a from the URSP 122. The traffic descriptors associated with the first application 124a identify the first network slice 202a through which the first application 124a is to communicate with, for example, the first remote application 126a. The first network slice 202a of the radio access network (RAN) 204 connects the UE 102 to a first user plane function (UPF) 208a in the 5G core network 110. The security descriptors associated with the first application 124a in the first scenario comprise a security flag indicating that the first network slice 202a is not secure. The UE 102 binds traffic for the first application 124a to a first PDU session 206a based on the traffic descriptors associated with the first application 124a. If not already established, the first PDU session 206a is established based on the traffic descriptors associated with the first application 124a. The first application 124a then communicates with the core network 110 via the first network slice 202a. The first application 124a in the first scenario may be said to be operating in a normal mode because the first network slice 202a lacks security measures such that other network slices could potentially eavesdrop or infiltrate the first network slice 202a.

In a second scenario, the UE 102 receives a request, such as from a user of the UE 102, to initialize a second application 124b on the UE 102. The second application 124b may be a secure application. In response to receiving the request, the UE 102 queries the URSP 122 based on the second application 124b. For example, the UE 102 may query the URSP 122 based on an application ID of the second application 124b. In response to the querying, the UE 102 receives traffic descriptors and security descriptors associated with the second application 124b from the URSP 122. The traffic descriptors associated with the second application 124b identify the second network slice 202b through which the second application 124b is to communicate with, for example, the second remote application 126b. The second network slice 202b of the RAN 204 connects the UE 102 to a second UPF 208b in the 5G core network 110. The security descriptors associated with the second application 124b in the second scenario comprise a security flag indicating that the second network slice 202b is secure and a virtualization container ID corresponding to the first virtualization container 210a. If the first virtualization container 210a is not yet in existence, the container management component 120 creates the first virtualization container 210a. The first virtualization container 210a may comprise an operating system container, a virtual machine, a hypervisor type of container, or another type of container.

The UE initiates the second application 124b within the first virtualization container 210a corresponding to the virtualization container ID based on the security flag indicating that the second network slice 202b is secure. This binds the first virtualization container 210a to the second network slice 202b. The UE 102 binds the traffic for the second application 124b in the first virtualization container 210a to a second PDU session 206b based on the traffic descriptors associated with the second application 124b. If not already established, the second PDU session 206b is established based on the traffic descriptors associated with the second application 124b. The second application 124b executing in the first virtualization container 210a then communicates with the core network 110 via the second network slice 202b bound to the first virtualization container 210a. As can be seen in the second scenario, the URSP 122 through the security descriptors enables binding the first virtualization container 210a to the second PDU session 206b on the second network slice 202b in order to maintain the separation of traffic by routing secure traffic for the second, secure network slice 202b separate from all other traffic on other network slices (e.g., the first network slice 202a). Thus, the second application 124b in the second scenario may be said to be operating in a secure mode.

In a third scenario, the UE 102 receives requests, such as from a user of the UE 102, to initialize a third application 124c and a fourth application 124d on the UE 102. These requests may be received at different times. The third application 124c and the fourth application 124d may be secure applications. In response to receiving the requests, the UE 102 queries the URSP 122 based on the third application 124c and the fourth application 124d. For example, the UE 102 may query the URSP 122 based on an application ID of the third application 124c and based on an application ID of the fourth application 124d. The query of the URSP 122 based on the third application 124c may occur at a different time than the query of the URSP 122 based on the fourth application 124d depending on when the applications were requested to be initialized.

In response to querying the URSP 122 based on the third application 124c, the UE 102 receives traffic descriptors and security descriptors associated with the third application 124c from the URSP 122. The traffic descriptors associated with the third application 124c identify the third network slice 202c through which the third application 124c is to communicate with, for example, the third remote application 126c. In response to querying the URSP 122 based on the fourth application 124d, the UE 102 receives traffic descriptors and security descriptors associated with the fourth application 124d from the URSP 122. The traffic descriptors associated with the fourth application 124d identify the third network slice 202c through which the fourth application 124d is to communicate with, for example, the fourth remote application 126d. The third network slice 202d of the RAN 204 connects the UE 102 to a third UPF 208c and a fourth UPF 208d in the 5G core network 110.

The security descriptors associated with the third application 124c in the third scenario comprise a security flag indicating that the third network slice 202c is secure, a virtualization container ID corresponding to the second virtualization container 210b, and a tunnel ID corresponding to a first secure tunnel 214a. The security descriptors associated with the fourth application 124d in the third scenario comprise a security flag indicating that the third network slice 202c is secure, a virtualization container ID corresponding to the second virtualization container 210b, and a tunnel ID corresponding to a second secure tunnel 214b. If the second virtualization container 210b is not yet in existence, the container management component 120 creates the second virtualization container 210b. The second virtualization container 210b may comprise an operating system container, a virtual machine, a hypervisor type of container, or another type of container.

The UE 102 initiates the third application 124c within the second virtualization container 210b corresponding to the virtualization container ID based on the security flag indicating that the third network slice 202c is secure, thereby binding the second virtualization container 210b to the third network slice 202c. The UE 102 also initiates the fourth application 124d within the second virtualization container 210b corresponding to the virtualization container based on the security flag indicating that the third network slice 202c is secure.

The UE 102 may provide one or more of the security descriptors associated with the third application 124c, such as the tunnel ID, to the second virtualization container 210b. The UE 102 binds the traffic for the third application 124c in the second virtualization container 210b to a third PDU session 206c based on the traffic descriptors associated with the third application 124c. If not already established, the third PDU session 206c is established based on the traffic descriptors associated with the third application 124c. If the first secure tunnel 214a is not yet established, the secure tunnel manager 212 executing in the second virtualization container 210b establishes the first secure tunnel 214a over the third PDU session 206c based on the tunnel ID corresponding to the first secure tunnel 214a. The first secure tunnel 214a may be established using IPSec, Wireguard VPN (P2P), or another secure tunnel software. The third application 124c executing within the second virtualization container 210b communicates with the core network 110 or another network over the first secure tunnel 214a within the third network slice 202c bound to the second virtualization container 210b.

The UE 102 may provide one or more security descriptors associated with the fourth application 124d to the second virtualization container 210b. The UE 102 binds the traffic for the fourth application 124d in the second virtualization container 210b to a fourth PDU session 206d based on the traffic descriptors associated with the fourth application 124d. If not already established, the fourth PDU session 206d is established based on the traffic descriptors associated with the fourth application 124d.

If the second secure tunnel 214b is not yet established, the secure tunnel manager 212 executing in the second virtualization container 210b establishes the second secure tunnel 214b over the fourth PDU session 206d based on the tunnel ID corresponding to the second secure tunnel 214b. The second secure tunnel 214b may be established using IPSec, WireGuard VPN (P2P), or another secure tunnel software. The fourth application 124d executing within the second virtualization container 210b communicates with the core network 110 or another network over the second secure tunnel 214b within the third network slice 202c bound to the second virtualization container 210b. The individual secure tunnels 214a and 214b may be established based on the corresponding security descriptors received from the URSP 122. The individual secure tunnels 214a and 214b enable segregation between the third application 124c and the fourth application 124d executing in the same second virtualization container 210b and allow data to be routed individually over different paths.

As can be seen in the third scenario, the URSP 122 through the security descriptors enables binding the second virtualization container 210b to the third PDU session 206c and the fourth PDU session 206d on the third network slice 202c in order to maintain the separation of traffic by routing secure traffic for the third, secure network slice 202c separate from all other traffic on other network slices (e.g., the first network slice 202a and the second network slice 202b). Thus, the third application 124c and the fourth application 124d in the third scenario may be said to be operating in a secure mode.

In some embodiments, to provide further security, data communicated via the first secure tunnel 214a and/or the second secure tunnel 214b may be encrypted based on encryption keys. For added security, the encryption keys may be stored within the second virtualization container 210b. Since other applications on the UE 102 outside the second virtualization container 210b cannot access the second virtualization container 210b, those other applications cannot access the encryption keys if they are stored in the second virtualization container 210b and hence would not be able to gain access into the first secure tunnel 214a and/or the second secure tunnel 214b. A virtualization container cannot reach into and read data stored in a different container. In an alternative embodiment, the encryption keys may be stored in a centralized store.

In an embodiment, as an alternative to encryption, the security descriptors may comprise a user plane confidentiality protection flag. If the user plane confidentiality protection flag indicates that integrity protection should occur, the first secure tunnel 214a and/or the second secure tunnel 214b is configured such that the data being communicated through the first secure tunnel 214a and/or the second secure tunnel 214b cannot be altered. However, in contrast to encryption, the data would be able to be seen.

Figure 2A:
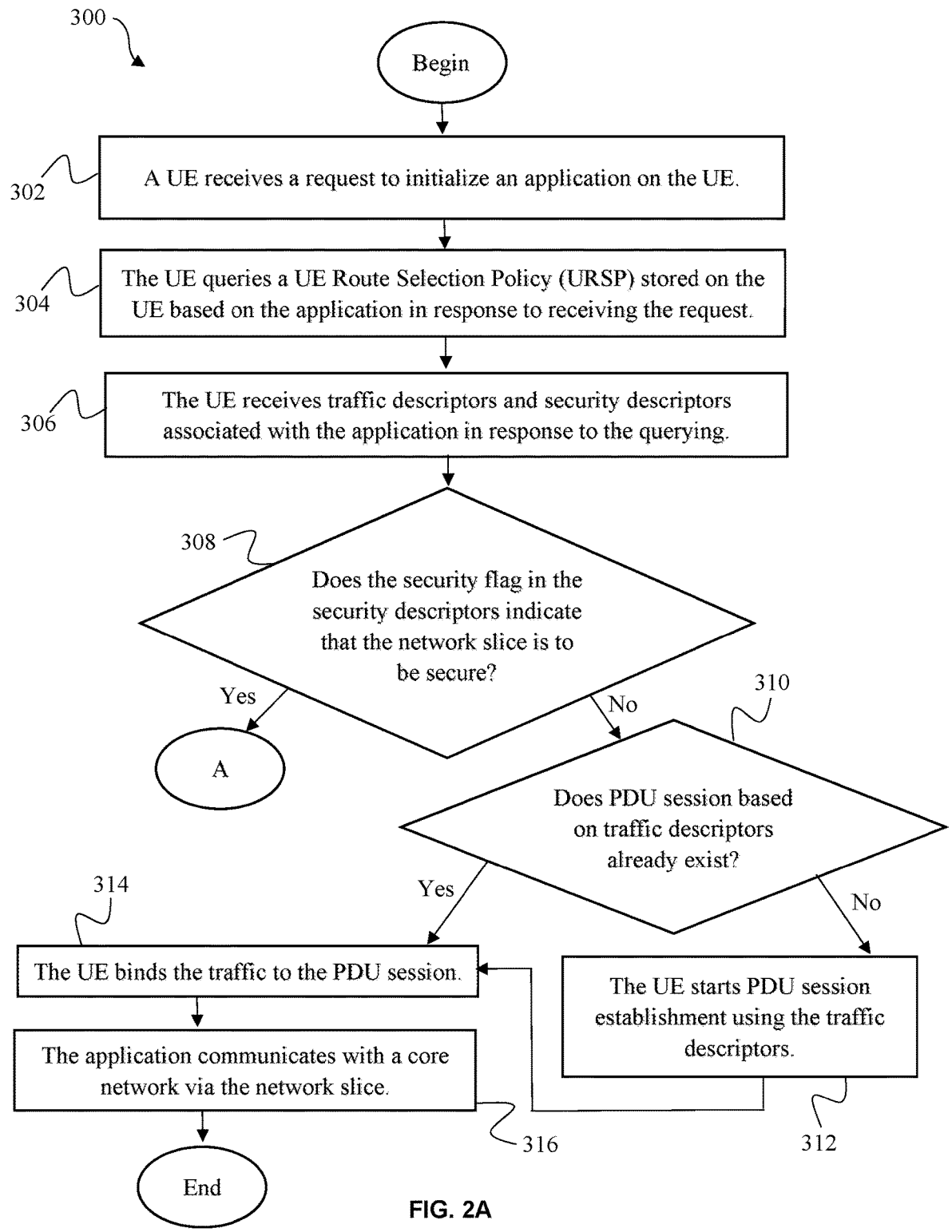
FIG. 2A, FIG. 2B, and FIG. 2C are flow charts of a method according to an embodiment of the disclosure.
Figure 2B:
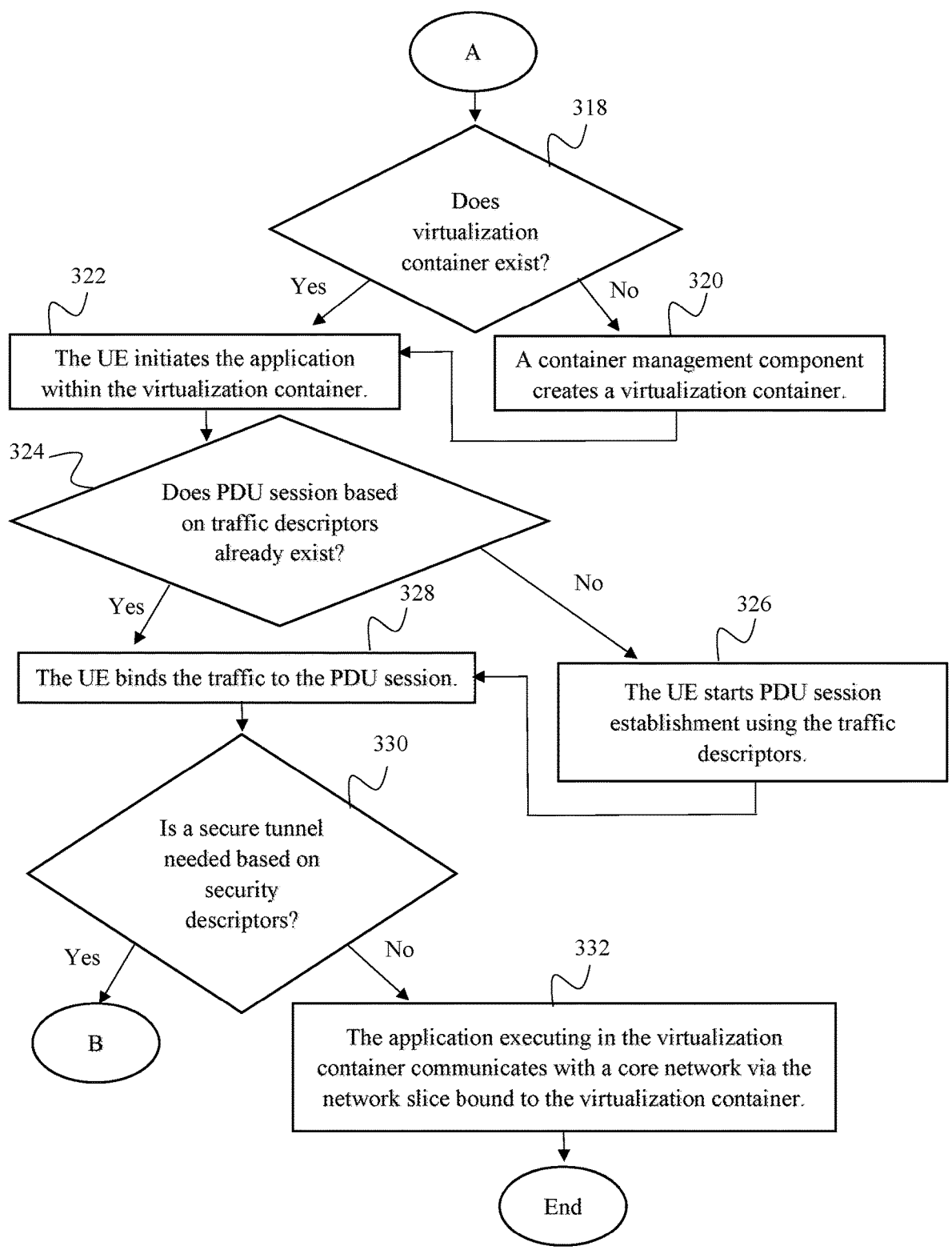
Figure 2C:
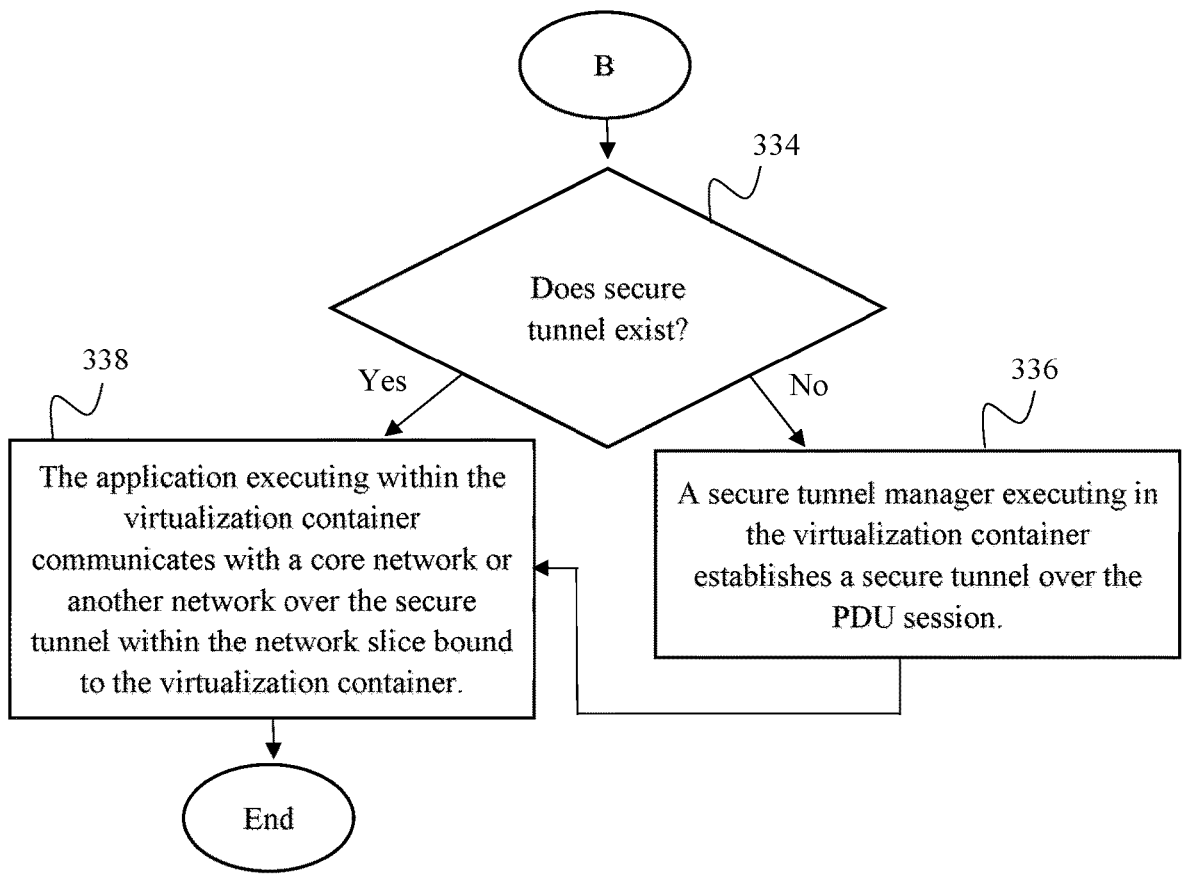

Turning now to FIG. 2A, FIG. 2B, and FIG. 2C, a method 300 is described. In an embodiment, the method 300 is a method of user equipment (UE) implemented network slice security protection. At block 302, a UE receives a request to initialize an application on the UE. For example, the request to initialize an application on the UE may be from a user of the UE. Alternatively, the request to initialize an application on the UE may be from an external server or the network. At block 304, the UE queries a UE Route Selection Policy (URSP) stored on the UE based on the application in response to receiving the request. At block 306, the UE receives traffic descriptors and security descriptors associated with the application in response to the querying. At block 308, a determination is made whether the security flag in the security descriptors indicates that the network slice is to be secure. At block 310, if the security flag indicates that the network slice is not secure, a determination is made whether a PDU session based on the traffic descriptors already exists. At block 312, if the PDU session does not already exist, the UE starts PDU session establishment using the traffic descriptors. At block 314, if the PDU session already exits or after the PDU session is established, the UE binds the traffic to the PDU session. At block 316, the application communicates with a core network via the network slice.

At block 318, if the security flag indicates that the network slice is secure, a determination is made whether a virtualization container corresponding to the virtualization container ID in the security descriptors exists. At block 320, if the virtualization container does not already exist, a container management component on the UE creates the virtualization container based on the security descriptors. At block 322, if the virtualization container already exists or after the virtualization container is created, the UE initiates the application within the virtualization container. At block 324, a determination is made whether a PDU session based on the traffic descriptors already exists. At block 326, if the PDU session does not already exist, the UE starts PDU session establishment using the traffic descriptors. At block 328, if the PDU session already exists or after the PDU session is established, the UE binds the traffic to the PDU session.

At block 330, a determination is made whether a secure tunnel is needed based on the security descriptors. At block 332, if a secure tunnel is not needed, the application executing in the virtualization container communicates with a core network via the network slice bound to the virtualization container. At block 334, if a secure tunnel is needed, a determination is made whether the secure tunnel already exists. At block 336, if the secure tunnel does not already exist, a secure tunnel manager executing in the virtualization container establishes the secure tunnel over the PDU session based on the security descriptors. At block 338, if the secure tunnel already exists or after the secure tunnel is established, the application executing within the virtualization container communicates with a core network (or another network beyond the core network) over the secure tunnel within the network slice bound to the virtualization container.

Figure 3:
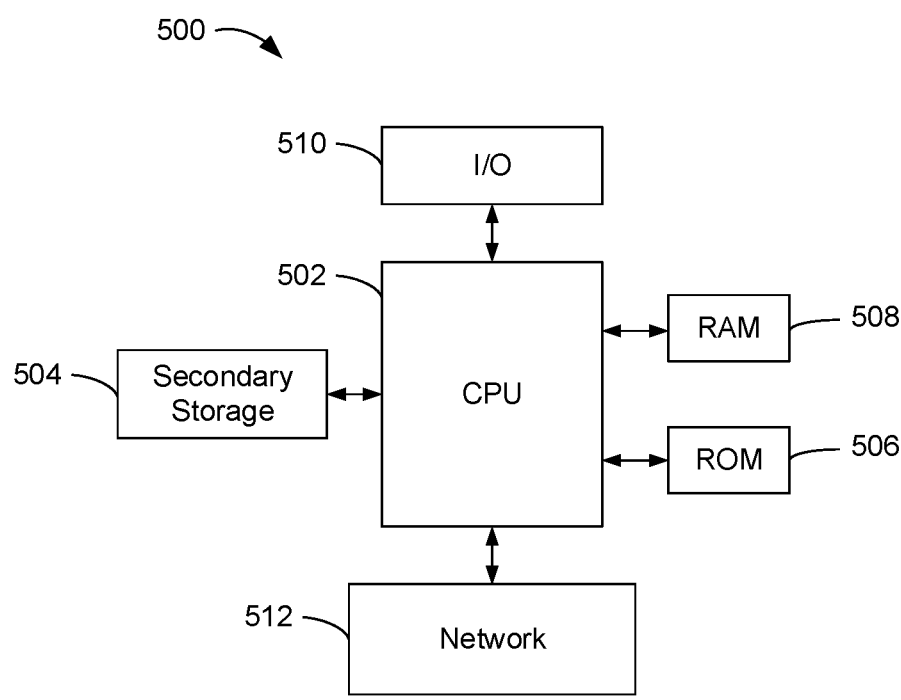
FIG. 3 is a block diagram of a computer system according to an embodiment of the disclosure.

FIG. 3 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508.

In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embodied in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

Figure 4:
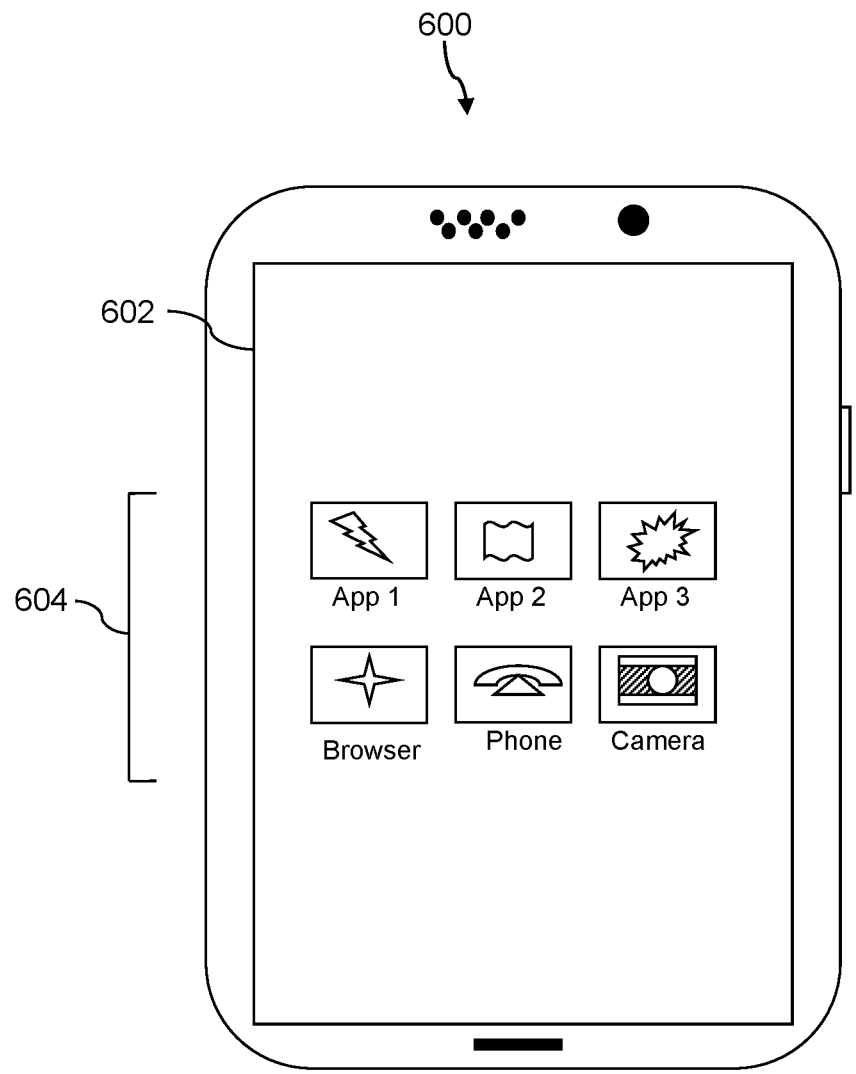
FIG. 4 is an illustration of a handset according to an embodiment of the disclosure.

FIG. 4 depicts the user equipment (UE) 600, which is operable for implementing aspects of the present disclosure, but the present disclosure should not be limited to these implementations. Though illustrated as a mobile phone, the UE 600 may take various forms including a wireless handset, a pager, a personal digital assistant (PDA), a gaming device, or a media player. The UE 600 includes a touch-screen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

Figure 5:
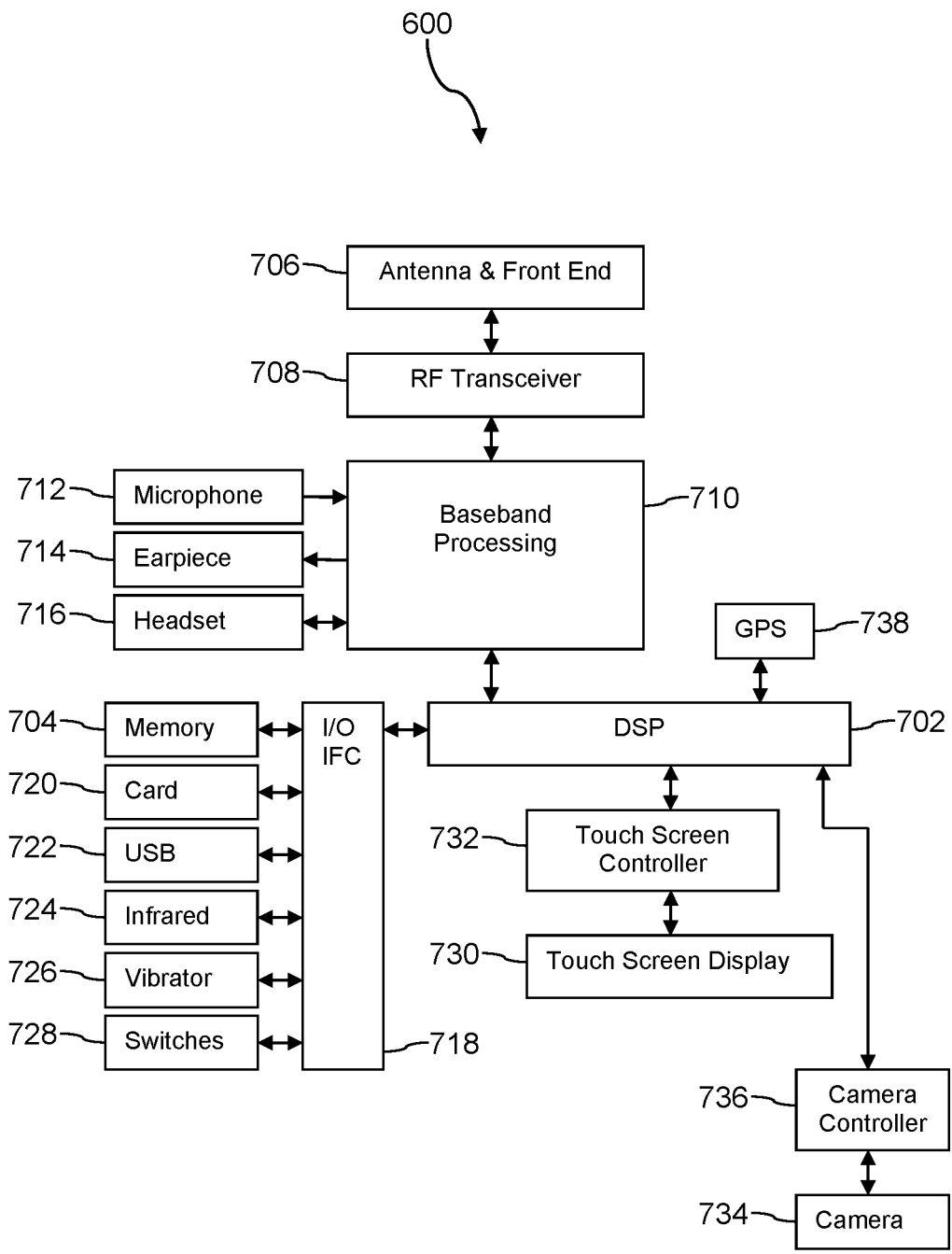
FIG. 5 is a block diagram of a hardware architecture for a user equipment (UE) according to an embodiment of the disclosure.

FIG. 5 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include one or more antenna and front end unit 706, a one or more radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen display 730, a touch screen controller 732, a camera 734, a camera controller 736, and a global positioning system (GPS) receiver 738. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth® interface or an IEEE 802.11 compliant wireless interface may enable the UE 600 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 708 may comprise a near field communication (NFC) transceiver. The NFC transceiver may be used to complete payment transactions with point-of-sale terminals or other communications exchanges. In an embodiment, each of the different radio transceivers 708 may be coupled to its own separate antenna. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 6A:
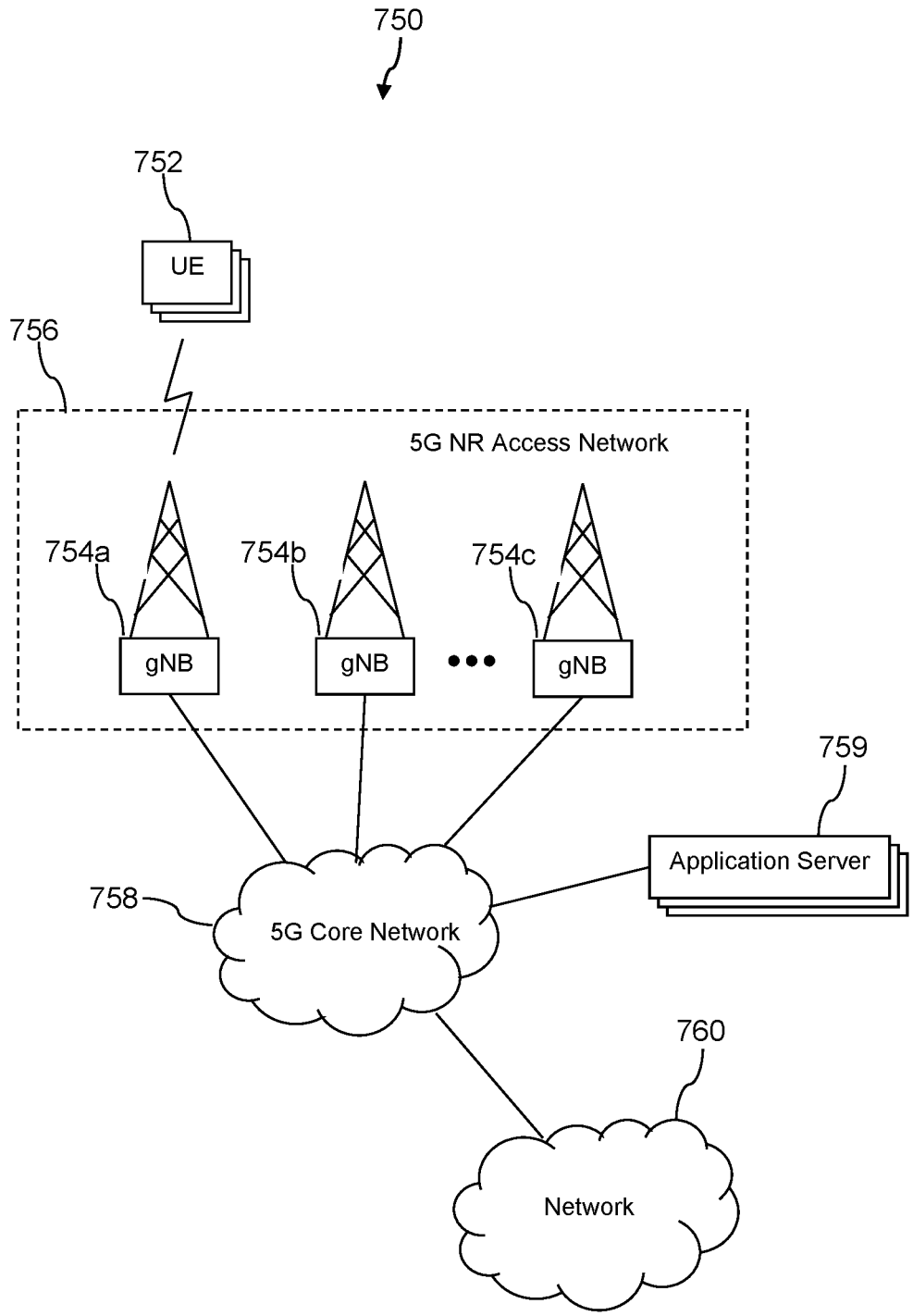
FIG. 6A and FIG. 6B are block diagrams of a 5G network architecture according to an embodiment of the disclosure.

Turning now to FIG. 6A, an exemplary communication system 750 is described. Typically, the communication system 750 includes a number of access nodes 754 that are configured to provide coverage in which UEs 752 such as cell phones, tablet computers, machine-type-communication devices, tracking devices, embedded wireless modules, and/or other wirelessly equipped communication devices (whether or not user operated), can operate. The access nodes 754 may be said to establish an access network 756. The access network 756 may be referred to as a radio access network (RAN) in some contexts. In a 5G technology generation an access node 754 may be referred to as a next Generation Node B (gNB). In 4G technology (e.g., long term evolution (LTE) technology) an access node 754 may be referred to as an evolved Node B (eNB). In 3G technology (e.g., code division multiple access (CDMA) and global system for mobile communication (GSM)) an access node 754 may be referred to as a base transceiver station (BTS) combined with a base station controller (BSC). In some contexts, the access node 754 may be referred to as a cell site or a cell tower. In some implementations, a picocell may provide some of the functionality of an access node 754, albeit with a constrained coverage area. Each of these different embodiments of an access node 754 may be considered to provide roughly similar functions in the different technology generations.

In an embodiment, the access network 756 comprises a first access node 754a, a second access node 754b, and a third access node 754c. It is understood that the access network 756 may include any number of access nodes 754. Further, each access node 754 could be coupled with a core network 758 that provides connectivity with various application servers 759 and/or a network 760. In an embodiment, at least some of the application servers 759 may be located close to the network edge (e.g., geographically close to the UE 752 and the end user) to deliver so-called "edge computing." The network 760 may be one or more private networks, one or more public networks, or a combination thereof. The network 760 may comprise the public switched telephone network (PSTN). The network 760 may comprise the Internet. With this arrangement, a UE 752 within coverage of the access network 756 could engage in air-interface communication with an access node 754 and could thereby communicate via the access node 754 with various application servers and other entities.

The communication system 750 could operate in accordance with a particular radio access technology (RAT), with communications from an access node 754 to UEs 752 defining a downlink or forward link and communications from the UEs 752 to the access node 754 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers (ISPs) for laptops and desktop computers, competing with existing ISPs such as cable internet, and also will make possible new applications in internet of things (IoT) and machine to machine areas.

In accordance with the RAT, each access node 754 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 754 could define an air interface configured in a specific manner to define physical resources for carrying information wirelessly between the access node 754 and UEs 752.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and sub-carrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 752.

In addition, certain resource elements on the example air interface could be reserved for special purposes. For instance, on the downlink, certain resource elements could be reserved to carry synchronization signals that UEs 752 could detect as an indication of the presence of coverage and to establish frame timing, other resource elements could be reserved to carry a reference signal that UEs 752 could measure in order to determine coverage strength, and still other resource elements could be reserved to carry other control signaling such as PRB-scheduling directives and acknowledgement messaging from the access node 754 to served UEs 752. And on the uplink, certain resource elements could be reserved to carry random access signaling from UEs 752 to the access node 754, and other resource elements could be reserved to carry other control signaling such as PRB-scheduling requests and acknowledgement signaling from UEs 752 to the access node 754.

The access node 754, in some instances, may be split functionally into a radio unit (RU), a distributed unit (DU), and a central unit (CU) where each of the RU, DU, and CU have distinctive roles to play in the access network 756. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 6B:
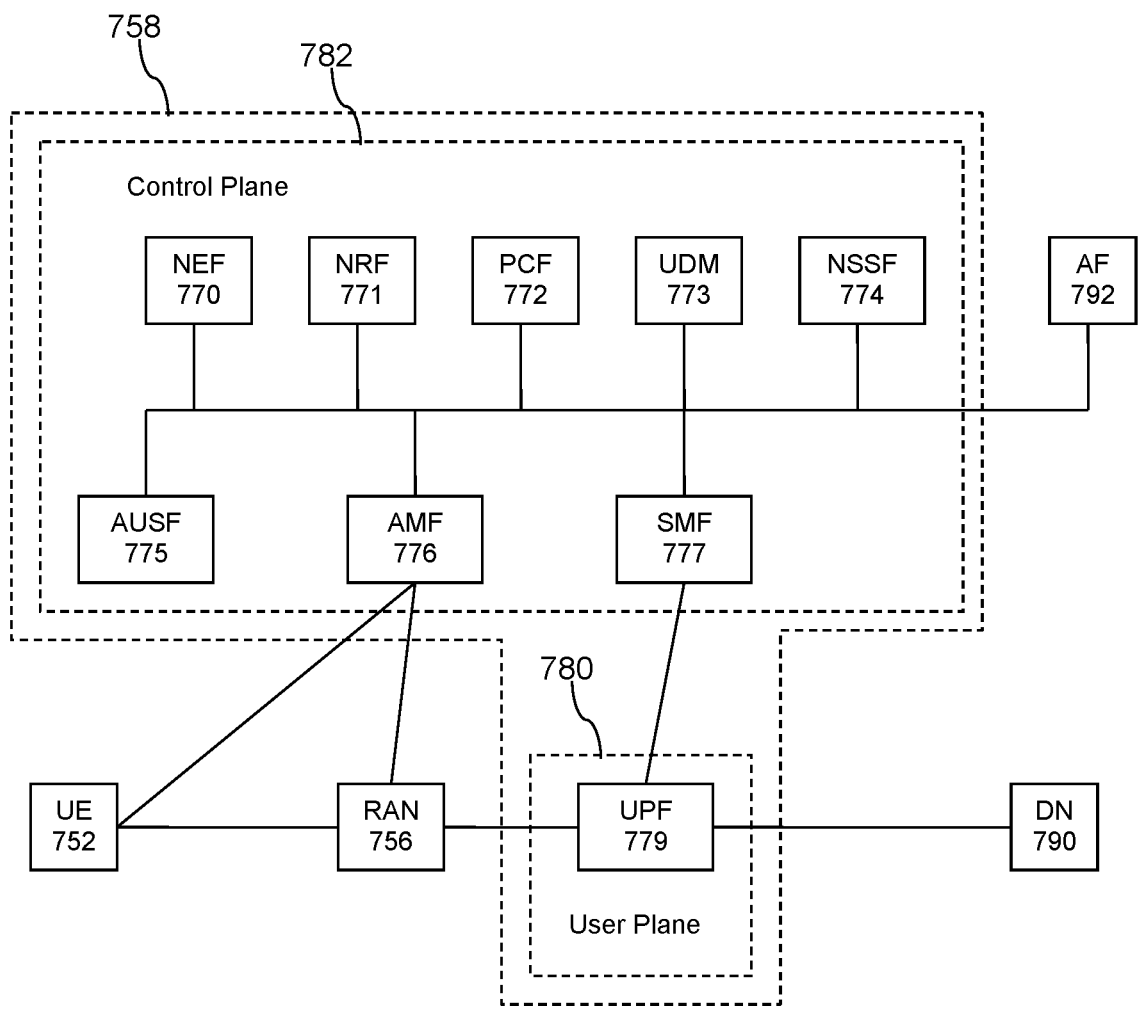

Turning now to FIG. 6B, further details of the core network 758 are described. In an embodiment, the core network 758 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 779, an authentication server function (AUSF) 775, an access and mobility management function (AMF) 776, a session management function (SMF) 777, a network exposure function (NEF) 770, a network repository function (NRF) 771, a policy control function (PCF) 772, a unified data management (UDM) 773, a network slice selection function (NSSF) 774, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 758 may be segregated into a user plane 780 and a control plane 782, thereby promoting independent scalability, evolution, and flexible deployment.

The UPF 779 delivers packet processing and links the UE 752, via the access network 756, to a data network 790 (e.g., the network 760 illustrated in FIG. 6A). The AMF 776 handles registration and connection management of non-access stratum (NAS) signaling with the UE 752. Said in other words, the AMF 776 manages UE registration and mobility issues. The AMF 776 manages reachability of the UEs 752 as well as various security issues. The SMF 777 handles session management issues. Specifically, the SMF 777 creates, updates, and removes (destroys) protocol data unit (PDU) sessions and manages the session context within the UPF 779. The SMF 777 decouples other control plane functions from user plane functions by performing dynamic host configuration protocol (DHCP) functions and IP address management functions. The AUSF 775 facilitates security processes.

The NEF 770 securely exposes the services and capabilities provided by network functions. The NRF 771 supports service registration by network functions and discovery of network functions by other network functions. The PCF 772 supports policy control decisions and flow based charging control. The UDM 773 manages network user data and can be paired with a user data repository (UDR) that stores user data such as customer profile information, customer authentication number, and encryption keys for the information. An application function 792, which may be located outside of the core network 758, exposes the application layer for interacting with the core network 758. In an embodiment, the application function 792 may be execute on an application server 779 located geographically proximate to the UE 752 in an "edge computing" deployment mode. The core network 758 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 774 can help the AMF 776 to select the network slice instance (NSI) for use with the UE 752.

Figure 7A:
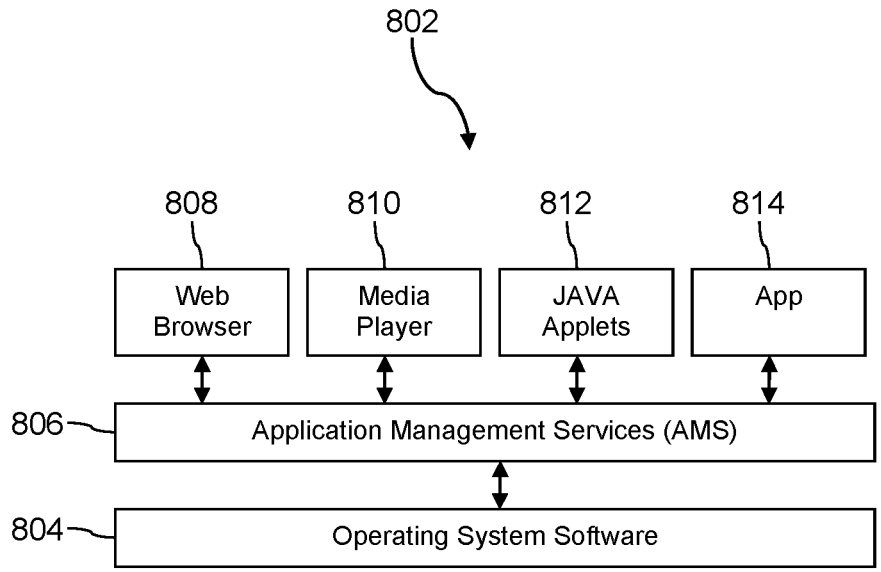
FIG. 7A is a block diagram of a software architecture according to an embodiment of the disclosure.

FIG. 7A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 400. Also shown in FIG. 7A are a web browser application 808, a media player application 810, JAVA applets 812, and/or another application 814. The web browser application 808 may be executed by the UE 400 to browse content and/or the Internet, for example when the UE 400 is coupled to a network via a wireless link. The web browser application 808 may permit a user to enter information into forms and select links to retrieve and view web pages. The media player application 810 may be executed by the UE 400 to play audio or audiovisual media. The JAVA applets 812 may be executed by the UE 400 to provide a variety of functionality including games, utilities, and other functionality.

Figure 7B:
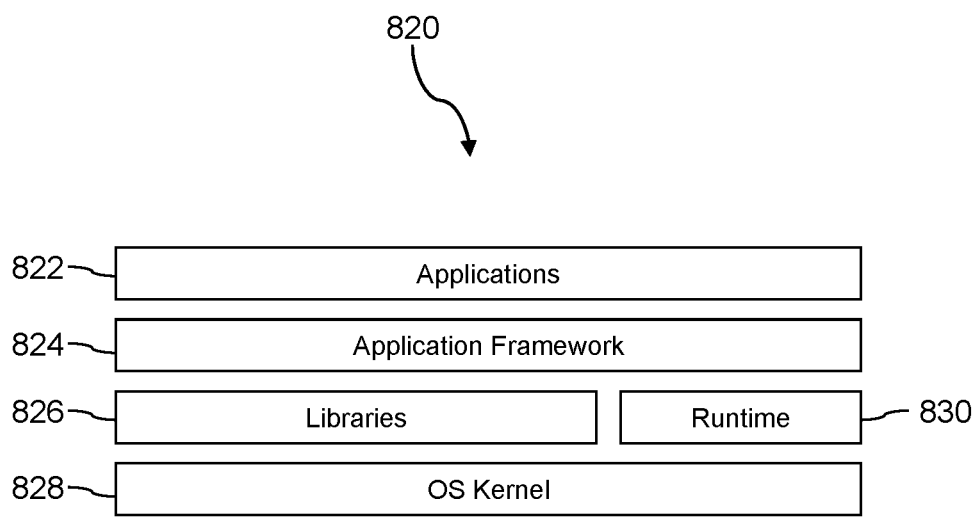
FIG. 7B is a block diagram of another software architecture according to an embodiment of the disclosure.

FIG. 7B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of user equipment (UE) implemented network slice security protection, comprising:
   receiving, by the UE, a request to initialize an application on the UE;
   querying, by the UE, a UE Route Selection Policy (URSP) stored on the UE based on the application;
   in response to the querying, initiating, by a UE, an application within a virtualization container, wherein the virtualization container is bound to a network slice;
   binding, by the UE, traffic for the application in the virtualization container to a protocol data unit (PDU) session; and
   communicating, by the application executing within the virtualization container, with a core network over the PDU session via the network slice bound to the virtualization container, wherein a secure boundary is created via use of the virtualization container to prevent data leakage from the network slice to other network slices.

2. The method of claim 1, further comprising creating, by a container management component, the virtualization container after receiving the request if the virtualization container is not yet in existence.

3. The method of claim 1, wherein the URSP comprises a plurality of traffic descriptors and a plurality of security descriptors.

4. The method of claim 3, further comprising receiving, by the UE, traffic descriptors associated with the application, wherein the traffic descriptors associated with the application identify the network slice to be used by the application.

5. The method of claim 3, further comprising, receiving, by the UE, security descriptors associated with the application, wherein the security descriptors associated with the application comprise a security flag and a virtualization container ID corresponding to the virtualization container.

6. The method of claim 5, wherein the security descriptors associated with the application further comprise a tunnel ID.

7. The method of claim 6, further comprising:
   establishing, by a secure tunnel manager executing in the virtualization container, a secure tunnel over the PDU session corresponding to the traffic descriptors associated with the application, wherein the secure tunnel is established based on the tunnel ID, and wherein the application executing within the virtualization container communicates with the core network or another network over the secure tunnel within the network slice bound to the virtualization container.

8. The method of claim 7, wherein data communicated by the application over the secure tunnel is encrypted based on encryption keys, and wherein the encryption keys are stored in the virtualization container.

9. The method of claim 1, further comprising:
   receiving, by the UE, a second request to initialize a second application on the UE;
   in response to receiving the second request, performing, by the UE, a second query of the URSP stored on the UE based on the second application;
   in response to the second query, initiating, by the UE, the second application within the virtualization container;
   binding, by the UE, traffic for the second application in the virtualization container to a PDU session; and
   communicating, by the second application executing within the virtualization container, with the core network or another network via the network slice bound to the virtualization container.

10. The method of claim 1, further comprising:
    receiving, by the UE, a second request to initialize a second application on the UE;
    in response to receiving the second request, performing, by the UE, a second query of the URSP stored on the UE based on the second application;
    in response to the second query, initiating, by the UE, the second application within a second virtualization container, wherein the second virtualization container is bound to the second network slice;
    binding, by the UE, traffic for the second application in the second virtualization container to a PDU session; and
    communicating, by the second application executing within the second virtualization container, with the core network or another network via the second network slice bound to the second virtualization container.

11. A user equipment (UE) that implements network slice security protection, comprising:
    at least one non-transitory memory comprising an application; and
    at least one processor, wherein the UE is configured to:
      receive a request to initialize the application on the UE,
      query a UE Route Selection Policy (URSP) stored on the UE based on the application,
      in response to the querying, initiate an application within a virtualization container, wherein the virtualization container is bound to a network slice, and
      bind traffic for the application in the virtualization container to a protocol data unit (PDU) session, wherein the application executing within the virtualization container communicates with a core network over the PDU session via the network slice bound to the virtualization container, and wherein a secure boundary is created via use of the virtualization container to prevent data leakage from the network slice to other network slices.

12. The UE of claim 11, further comprising a container management component stored in the at least one non-transitory memory that, when executed by the at least one processor, creates the virtualization container after receiving the request if the virtualization container is not yet in existence.

13. The UE of claim 11, wherein the URSP comprises a plurality of traffic descriptors and a plurality of security descriptors.

14. The UE of claim 13, wherein the UE is further configured to receive traffic descriptors associated with the application, and wherein the traffic descriptors associated with the application identify the network slice to be used by the application.

15. The UE of claim 13, wherein the UE is further configured to receive security descriptors associated with the application, and wherein the security descriptors associated with the application comprise a security flag and a virtualization container ID corresponding to the virtualization container.

16. The UE of claim 15, wherein the security descriptors associated with the application further comprise a tunnel ID.

17. The UE of claim 16, further comprising a secure tunnel manager stored in the at least one non-transitory memory that, when executed by the at least one processor, establishes a secure tunnel over the PDU session corresponding to the traffic descriptors associated with the application, wherein the secure tunnel is established based on the tunnel ID, and wherein the application executing within the virtualization container communicates with the core network or another network over the secure tunnel within the network slice bound to the virtualization container.

18. The UE of claim 17, wherein data communicated by the application over the secure tunnel is encrypted based on encryption keys, and wherein the encryption keys are stored in the virtualization container.

19. The UE of claim 11, wherein the at least one non-transitory memory further comprises a second application, and wherein the UE is further configured to:
receive a second request to initialize the second application on the UE,
in response to receiving the second request, perform a second query of the URSP stored on the UE based on the second application,
in response to the second query, initiate the second application within the virtualization container, and
bind traffic for the second application in the virtualization container to a PDU session, wherein the second application executing within the virtualization container communicates with the core network or another network via the network slice bound to the virtualization container.

20. The UE of claim 11, wherein the at least one non-transitory memory further comprises a second application, and wherein the UE is further configured to:
receive a second request to initialize the second application on the UE,
in response to receiving the second request, perform a second query of the URSP stored on the UE based on the second application,
in response to the second query, initiate the second application within a second virtualization container, wherein the second virtualization container is bound to the second network slice, and
bind traffic for the second application in the second virtualization container to a PDU session, wherein the second application executing within the second virtualization container communicates with the core network or another network via the second network slice bound to the second virtualization container.

\* \* \* \* \*